3,465,069
PROCESS FOR TREATING ELECTROSTRICTIVE CERAMIC ELEMENTS

Carl T. Durham, Jr., Roanoke, Va., assignor to General Electric Company, a corporation of New York
No Drawing. Filed Oct. 13, 1966, Ser. No. 586,386
Int. Cl. C04b 35/46, 41/00
U.S. Cl. 264—82   1 Claim

ABSTRACT OF THE DISCLOSURE

The invention contemplates a process for ageing electrostrictive ceramic elements of the lead metaniobate and lead zirconate titanate types to increase the specific resistance of these elements prior to their being polarized. The process consists of heating the elements in a closure under a maintained sub-atmospheric pressure and a temperature maintained at several times room temperature for several hours, thereafter introducing oxygen at atmospheric pressure into the closure while maintaining the temperature constant for a fractional part of an hour.

---

The invention relates to electrostrictive ceramics, sometimes referred to as "ferroelectric materials," which are somewhat analogous to ferromagnetic materials in view of their electric polarization properties and which may be said to be activable polycrystalline dielectric materials exhibiting electrical characteristics such as resistance, dielectric constant, resonant frequency and the like.

The invention more specifically relates to electrostrictive ceramics as disclosed in United States Patents 2,729,757 and 2,805,165 to Goodman assigned to the assignee of this invention, relating to lead metaniobate ceramics, and is equaly applicable to electrostrictive ceramics as disclosed in United States Patent 2,708,244 to Jaffe, relating to lead zirconate titanate ceramics. Other related ceramic compositions having similar electrical properties, crystallographic structure and chemical compositions also fall within the premises of applicability under the process disclosed and claimed hereinafter.

The aforesaid ceramic materials normally are vitrified from solid solutions of oxides of the metals such as lead, zirconium, titanium and niobium according to processes shown in the aforementioned patents, resulting in substantially solid compositions of predetermined sizes and shapes, hereinafter referred to as "ceramic elements." At this stage the ceramic elements are non-responsive normally in respect to having piezoelectric properties, and further treatment is required by way of electrical activation, sometimes referred to as "polarization." United States Patents 2,706,326 to Mason, 2,729,757 referred to above and 2,928,163 to Berlincourt et al. describe several ways in which polarization may be accomplished. Essentially, however, polarization requires the application of high direct current voltages to the ceramic elements for a period of time while the elements are held at an elevated temperature above room temperature. In some instances polarizing direct current potentials may be required of as great as 80 volts per one thousandth inch of thickness of the elements, and to withstand these potentials without breaking down electrically the elements are aged for long periods of time by placing them in ovens heated to temperatures substantially above room temperature. The ageing periods frequently may require several weeks, and it appears that the ageing treatment performs a function whereby the specific resistance of the elements is increased by several orders of magnitude.

It is an object of this invention, therefore, to provide a method whereby the ageing time for electrostrictive ceramic elements may be reduced from a period of weeks to a period of hours.

Although the necessity for ageing the aforesaid ceramic elements is well recognized in the art the phenomenon is not well understood, and it is suspected that in some manner the oxygen content of the ceramic material is increased. It has also been determined that where no careful ageing of these ceramic elements is carried out the electrical and mechanical properties frequently change with time thereby introducing unreliability in their performance as electrostrictive devices.

It is therefore another object of this invention to provide a method for ageing electrostrictive ceramic elements to accurately stabilize their electrical and mechanical properties.

The principles and characteristics of the invention, as well as other objects and advantages are revealed and discussed through the medium of the illustrative embodiments appearing in the specification.

The process of the subject invention provides a method for suitably ageing ceramic elements by the application of controlled heating under sub-atmospheric pressure conditions, together with the introduction of oxygen at atmospheric pressure conditions thereafter. One such process, illustrating the invention, follows: Specifically after the ceramic elements have been vitrified they are placed in a closed oven to which a vacuum pump capable of minus 29 inches of mercury is attached, the oven temperature being brought to a value of 150 to 200 degrees centigrade and held at that value for four (4) hours. At the end of this period of time, oxygen ($O_2$) is introduced into the oven via a suitable valve regulating the pressure at atmospheric pressure through a port in the oven, the vacuum pump being regulated at this time so that the pressure within the oven is substantially that of atmospheric pressure. After the introduction of the oxygen the oven is held at between 150 and 200 degrees centigrade for 15 minutes. Thereafter the oxygen supply and the vacuum pump are cut off and the oven opened, allowing the ceramic elements to cool to room temperature. These elements are then ready for polarizing.

The effectiveness of the process described above is well illustrated by the following examples relative to increasing the specific resistance of sample ceramic elements, which in this instance were lead metaniobate discs 2 inches in diameter and $5/16$ inch in thickness, resistance being measured between the surfaces of the discs:

Sample No. 1 originally after being vitrified had a resistance of $2 \times 10^3$ megohms. After undergoing the above-described process of ageing (approximately 4¼ hours), Sample No. 1 had a resistance of $2 \times 10^6$ megohms.

Samples No. 2, No. 3 and No. 4 were first heated in an oven at 120 degrees centigrade and atmospheric pressure for 18 hours, after which time the resistances were:

Sample No. $2 = 2.5 \times 10^2$ megohms
Sample No. $3 = 2.1 \times 10^2$ megohms
Sample No. $4 = 1.0 \times 10^2$ megohms After undergoing the ageing process referred to in respect to Sample No. 1, the resistances were:

Sample No. $2 = 1.5 \times 10^5$ megohms
Sample No. $3 = 1.0 \times 10^5$ megohms
Sample No. $4 = .5 \times 10^5$ megohms The last three samples were thereafter put through the aforesaid ageing process a second time (for a further 4¼ hours) after which the resistances were:

Sample No. 2=9.0×10$^5$ megohms
Sample No. 3=5.0×10$^5$ megohms
Sample No. 4=3.0×10$^5$ megohms From these results it appeared that with successive cycles of the ageing process ceramic elements' specific resistance can be further increased; however, the first cycle of treatment appears to effect the greatest increase.

Subsequent experimentation shows that the parameters of the ageing process may vary within wide limits without materially affecting the time period required for ageing the ceramic elements to have substantially maximum specific resistance, provided that the process is carried out at a pressure below atmospheric with the introduction of oxygen at a pressure above that value and at a temperature above room temperature.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions.

What is claimed is:
1. A process for conditioning an electrostrictive ceramic element comprising:
(a) placing the element in an oven,
(b) evacuating the oven to a pressure of minus 29 inches of mercury,
(c) heating the oven containing the element to a temperature of 150–200° C. for a period of four hours,
(d) introducing oxygen (O$_2$) at atmospheric pressure into the oven for a period of 15 minutes,
(e) removing heat from the oven and allowing the element to return to room temperature.

References Cited
UNITED STATES PATENTS

| | | | |
|---|---|---|---|
| 2,272,330 | 2/1942 | Schupp | 106—39 |
| 2,731,419 | 1/1956 | Goodman | 106—39 |
| 2,742,370 | 4/1956 | Wainer | 106—39 |
| 2,853,392 | 9/1958 | Bousky | 106—39 |
| 2,922,730 | 1/1960 | Feldman | 106—39 |
| 3,179,594 | 4/1965 | Kulcsar et al. | 106—39 |
| 2,721,182 | 10/1955 | Clement | 106—39 |

JULIUS FROME, Primary Examiner

A. H. KOECKERT, Assistant Examiner

U.S. Cl. X.R.

264—345; 106—39